SARAH LAWTON.
FISH-SCALER.
No. 173,799.        Patented Feb. 22, 1876.
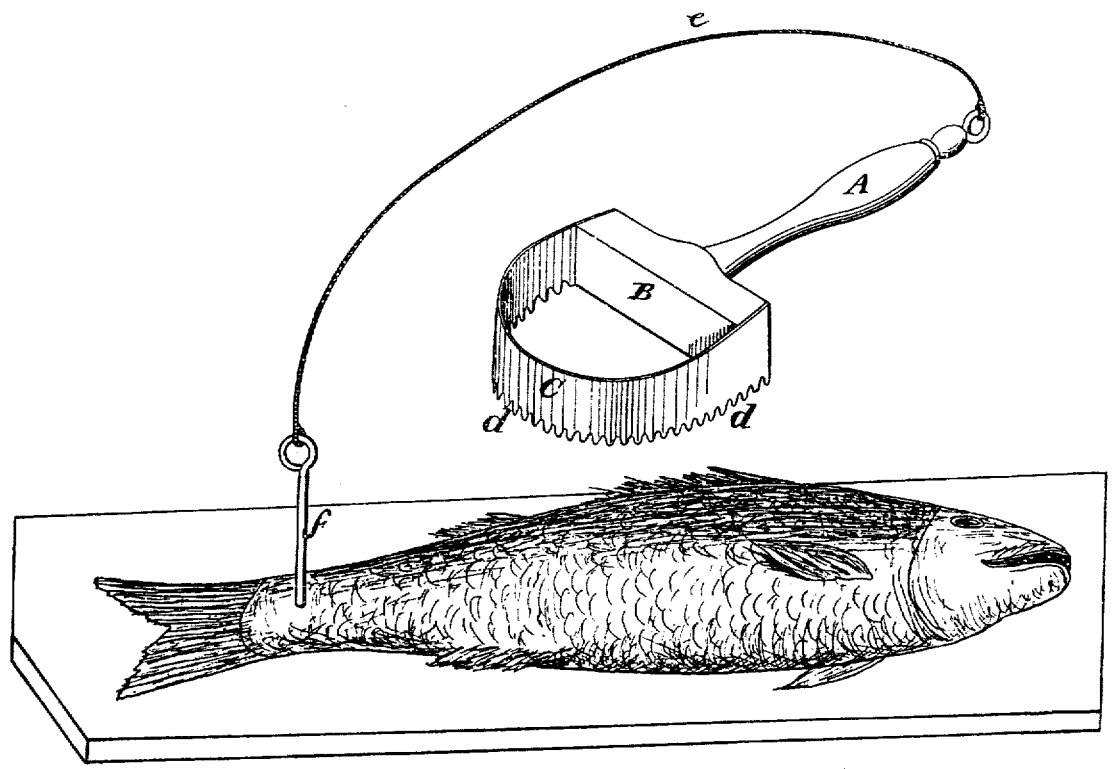

UNITED STATES PATENT OFFICE.

SARAH LAWTON, OF SAN FRANCISCO, CALIFORNIA.

IMPROVEMENT IN FISH-SCALERS.

Specification forming part of Letters Patent No. 173,799, dated February 22, 1876; application filed October 23, 1875.

*To all whom it may concern:*

Be it known that I, SARAH LAWTON, of San Francisco city and county, State of California, have invented a Fish Scaler and Scraper; and I do hereby declare the following description and accompanying drawings are sufficient to enable any person skilled in the art or science to which it most nearly appertains to make and use my said invention without further invention or experiment.

My invention relates to a cheap and convenient hand implement for removing scales from fish, and for scraping them after the scales are loosened.

Referring to the accompanying drawings, A is a handle, having a head or cross-bar, B, across one end. C is a thin metal blade of the desired length, one edge of which is provided with teeth $d\,d$, which are similar to saw-teeth, while its opposite edge is plain. This blade is bent to a semicircular form, and its ends are secured to the opposite ends of the head or block B, this forming a scraping-tool which can be very conveniently handled. To the opposite end of the handle I secure one end of a cord, $e$, which is of any desired length, and to the opposite end of the cord I attach a long pointed rod or spear, $f$.

In cleaning a fish I force the spear $f$ through its tail and press the point into the table underneath it by pushing downward upon it with the left hand; or, if desired, the spear can be driven firmly into the table or board upon which the fish is cleaned, and another spear can be passed through the gills of the fish and into the table, thus firmly fixing the fish in position between them. I then take the cleansing implement and loosen the scales of the fish with the toothed edge of the blade C by drawing it over the body of the fish from the tail to the head. When the scales are loosened I turn the implement over and scrape the fish with the plain edge, thus thoroughly cleansing it.

The spear and cord could be dispensed with, if desired; but I prefer to use them in the manner specified. I thus provide an extremely simple and convenient hand tool or implement for cleansing fish, which will save much time and do the work perfectly.

Having thus described my invention, what I claim, and desire to secure by Letters Patent, is—

A fish scaler and scraper consisting of the handle A, with its head or cross-bar B and semicircular blade C, one edge of which is toothed, substantially as and for the purpose described.

SARAH LAWTON.

Witnesses:
GEO. H. STRONG,
J. L. BOONE.